(12) United States Patent
Wier

(10) Patent No.: US 6,247,409 B1
(45) Date of Patent: Jun. 19, 2001

(54) IGNITER FOR A GAS GENERATOR

(75) Inventor: Franz Wier, Göggingen (DE)

(73) Assignee: TRW Occupant Restraint Systems GmbH & Co., KG, Alfdorf (DE)

( * ) Notice: Subject to any disclaimer, the term of this patent is extended or adjusted under 35 U.S.C. 154(b) by 0 days.

(21) Appl. No.: 09/326,077

(22) Filed: Jun. 4, 1999

(30) Foreign Application Priority Data

Jun. 4, 1998 (DE) .......................... 298 10 006 U

(51) Int. Cl.[7] .................. F42B 3/10; F42C 11/00; C06D 5/00

(52) U.S. Cl. .................. 102/202.5; 102/202; 102/202.7; 102/202.9; 102/202.11; 102/530; 102/531; 280/740; 280/741

(58) Field of Search ........................... 102/202.11, 202.9, 102/202.7, 202.5; 313/315, 316; 123/145 A

(56) References Cited

U.S. PATENT DOCUMENTS

| | | | |
|---|---|---|---|
| 722,913 | * 3/1903 | Schmitt et al. ............. | 102/202.5 |
| 2,228,342 | * 1/1941 | Claude ......................... | 176/16 |
| 2,481,696 | * 9/1949 | Seavey ......................... | 102/202.11 |
| 3,366,054 | * 1/1968 | Gruber, Jr. ................... | 102/202.11 |
| 3,407,732 | 10/1968 | Roza et al. . | |
| 3,661,085 | * 5/1972 | Smith et al. ................. | 102/202.9 |
| 3,737,706 | * 6/1973 | Lindburg et al. ............. | 313/109.5 |
| 3,959,684 | * 5/1976 | Anderson et al. ........... | 313/318 |
| 3,986,067 | * 10/1976 | De Fraeye ................... | 313/316 |
| 4,152,622 | * 5/1979 | Fitzgerald ................... | 313/315 |
| 4,174,488 | * 11/1979 | Weterings ................... | 313/315 |
| 4,179,637 | * 12/1979 | Santora ....................... | 313/316 |
| 4,208,609 | * 6/1980 | Berlec ......................... | 313/315 |
| 4,271,453 | * 6/1981 | Yajima et al. ............... | 102/202.9 |
| 4,287,452 | * 9/1981 | Fernandez, III ............. | 313/316 |
| 4,468,585 | * 8/1984 | Beyland et al. ............. | 313/318 |
| 4,621,578 | * 11/1986 | Vallieres et al. ............. | 102/202.5 |
| 4,841,196 | * 6/1989 | Waymouth ................... | 315/65 |
| 4,878,430 | * 11/1989 | Senkowski et al. .......... | 102/202.9 |
| 4,891,543 | * 1/1990 | DeBleyker ................... | 313/315 |
| 5,384,510 | * 1/1995 | Arnold ......................... | 313/316 |
| 5,394,801 | * 3/1995 | Faber et al. ................. | 102/202.11 |
| 5,886,458 | * 3/1999 | Hsu ............................. | 313/25 |

FOREIGN PATENT DOCUMENTS

| | | |
|---|---|---|
| 0648650 | 11/1994 | (EP) . |
| 0802092 | 10/1997 | (EP) . |
| 2191566-A | * 12/1987 | (GB) . |
| 2191566 | 12/1987 | (GB) . |

* cited by examiner

*Primary Examiner*—Charles T. Jordan
*Assistant Examiner*—Glenda L. Sánchez
(74) *Attorney, Agent, or Firm*—Tarolli, Sundheim, Covell, Tummino & Szabo L.L.P.

(57) ABSTRACT

An igniter for a gas generator comprises at least two connecting leads and an incandescent means arranged between the connecting leads and surrounded by an igniting substance. Several filaments are used as the incandescent means.

2 Claims, 2 Drawing Sheets

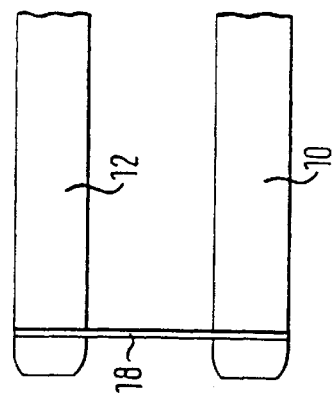
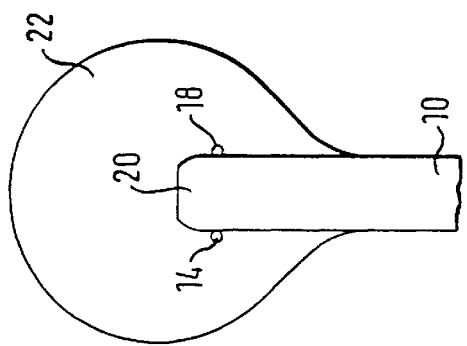
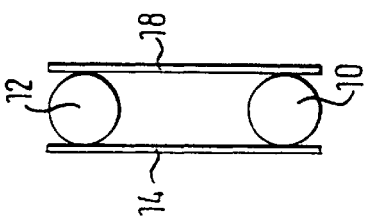
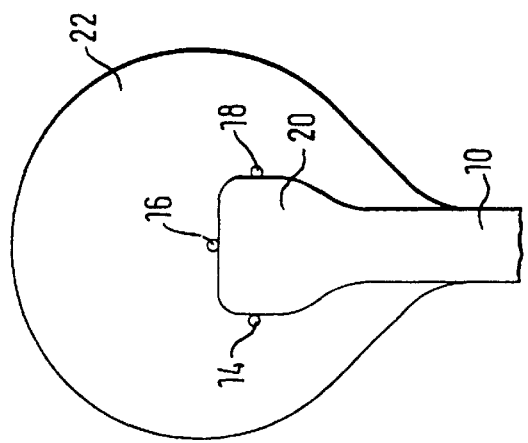
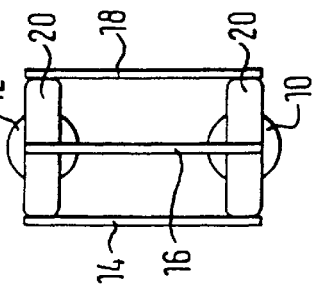

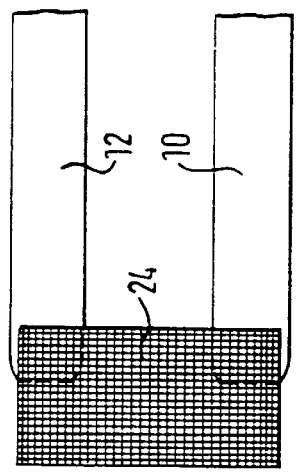
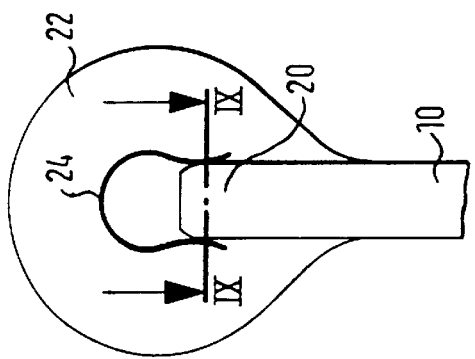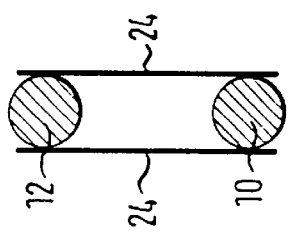
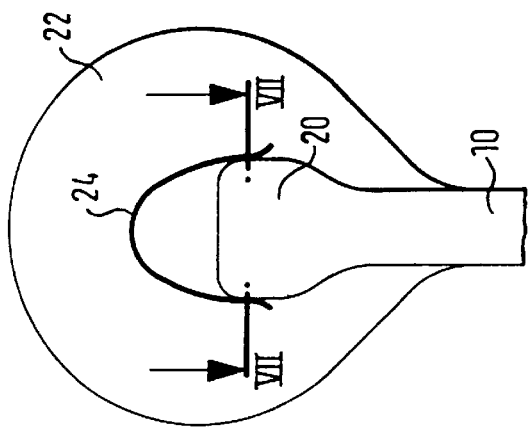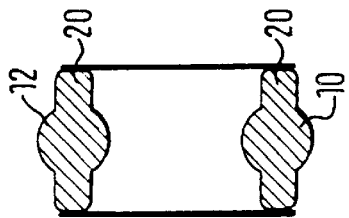

IGNITER FOR A GAS GENERATOR

BACKGROUND OF THE INVENTION

Typical igniters for a gas generator comprise at least two connecting leads and an incandescent means arranged between the connecting leads and surrounded by an igniting substance.

The igniter serves to ignite, when required, a gas generant of the gas generator, the gas generant then providing a pressurized gas. This gas may be used, for example, to deploy a gas bag of a vehicle occupant restraint system or to displace a piston of a linear drive.

The igniter is typically produced by the incandescent means first being attached to the two connecting leads. Subsequently the end of the connecting leads provided with the incandescent means is dipped into a liquefied igniting substance which adheres to the incandescent means. This procedure is repeated until the desired amount of igniting substance has built up on the end of the connecting leads provided with the incandescent means. Subsequently a so-called booster is provided around the igniting substance, this booster being ignited by the igniting substance on activation of the igniter, the booster in turn then igniting the gas generant of the gas generator. The booster is necessary since the igniting substance usually fails to furnish enough energy to ignite the gas generant in a sufficiently short period of time.

The object of the invention is to provide an igniter of the aforementioned kind, the production of which is simplified.

BRIEF DESCRIPTION OF THE INVENTION

An igniter according to the invention comprises at least two connecting leads and an incandescent means arranged between the connecting leads and surrounded by an igniting substance, several filaments being used as said incandescent means. This construction assures that when dipping the end of the connecting leads provided with the incandescent means into the igniting substance, substantially more igniting substance remains adhered to the incandescent means. In this way the number of dipping actions into the igniting substance can be considerably reduced resulting in cost-savings. Furthermore, so much igniting substance remains adhered to the incandescent means in all, that in some cases the booster can be eliminated since the build-up of igniting substance provides sufficient energy to directly ignite the gas generant, this too, resulting in cost-savings.

Advantageous aspects of the invention read from the sub-claims.

BRIEF DESCRIPTION OF THE DRAWINGS

The invention will now be described with reference to various embodiments as shown in the attached drawings in which:

FIG. 1 is a schematic side view of a first embodiment of the igniter in accordance with the invention;

FIG. 2 is a plan view of the connecting leads of the igniter as shown in FIG. 1;

FIG. 3 is a schematic side view of a second embodiment of the igniter in accordance with the invention;

FIG. 4 is a plan view of the connecting leads of the igniter as shown in FIG. 3;

FIG. 5 is a front view of the connecting leads of the igniter as shown in FIG. 3;

FIG. 6 is a schematic side view of a third embodiment of the igniter in accordance with the invention;

FIG. 7 is a section view taken along the plane VII—VII as shown in FIG. 6;

FIG. 8 is a schematic side view of a fourth embodiment of the igniter in accordance with the invention;

FIG. 9 is a section view taken along the plane IX—IX as shown in FIG. 8; and

FIG. 10 is front view of the connecting leads of the igniter as shown in FIG. 8.

DETAILED DESCRIPTION OF THE INVENTION

Referring now to the FIGS. 1 and 2 there is illustrated an igniter in accordance with a first embodiment of the invention, it containing two connecting leads 10, 12 as well as three filaments 14, 16, 18 arranged between the connecting leads 10, 12. The filaments 14, 16, 18 together form the incandescent means of the igniter.

Each contact lead 10, 12 is provided with a flattened and widened end 20 on which the filaments are arranged. The flattened and widened ends 20 are arranged such that their longitudinal planes extend parallel to each other. The filaments 14, 18 are arranged on the outer sides of the widened ends 20 facing away from each other whilst the filament 16 is arranged on the end face of the ends 20.

By repeatedly dipping the end of the connecting leads 10, 12 provided with the filaments 14, 16, 18 into a liquefied igniting substance, the igniting substance 22 builds up around the filaments. When a difference in potential is generated between the connecting leads 10, 12 a current flows through the filaments 14, 16, 18, as a result of which the latter start to glow. The energy released thereby ignites the igniting substance 22 which in turn is able to directly ignite the gas generant of an gas generator (not shown).

Referring now to FIGS. 3 to 5 there is illustrated an igniter in accordance with a second embodiment of the invention. Unlike the first embodiment only two filaments 14, 18 are used in the second embodiment, these filaments being applied to the opposite outer sides of the ends 20 of the connecting leads 10, 12. Here too, in using only two filaments, substantially more igniting substance 22 adheres thereto, as a result of which the use of a booster can be eliminated.

Referring now to FIGS. 6 and 7 there is illustrated an igniter in accordance with a third embodiment of the invention. In this embodiment a wire mesh 24 is employed as the incandescent means, which mesh is arranged between the connecting leads 10, 12. The wire mesh 24 is generally rectangular in shape when flat. The wire mesh 24 is connected to the widened ends 20 of the connecting leads 10, 12 by means of one of its corners each. The wire mesh 24 thus extends from one outer side of the widened ends 20 in a curve around the end face of these ends to the other outer side. By using the widened ends of the connecting leads 10, 12 it is assured that the wire mesh 24 has a large surface area, so that a large amount of igniting substance 22 can build up thereon.

Referring now to FIGS. 8 to 10 there is illustrated an igniter in accordance with a fourth embodiment of the invention. This fourth embodiment is similar to the third embodiment except for the configuration of the ends 20 of the contact pins. In the fourth embodiment no widened ends 20 are used. The wire mesh 24 is connected to the outer sides of the pin-shaped connecting leads 10, 12 in such a way that it extends curved about their end faces. In this configuration too, sufficient igniting substance 22 remains adhered to the wire mesh 24 to permit eliminating a booster.

What is claimed is:

1. An igniter for a gas generator, comprising at least two connecting leads and an incandescent means arranged between said connecting leads and surrounded by an igniting substance, wherein several filaments are used as said incandescent means, said connecting leads having ends with end faces and side faces in the vicinity of said end faces, said filaments being used in a number of three, one of said filaments being arranged at said end faces of said ends of said connecting leads connected to said incandescent means and the remaining two of said filaments being arranged opposite each other at said side faces.

2. An igniter for a gas generator, comprising at least two connecting leads and an incandescent means arranged between said connecting leads and surrounded by an igniting substance, wherein several filaments are used as said incandescent means, said filaments forming a wire mesh.

* * * * *